(12) United States Patent
Zia et al.

(10) Patent No.: US 7,303,605 B2
(45) Date of Patent: Dec. 4, 2007

(54) SNAP TOGETHER FILTER

(76) Inventors: Majid Zia, 4695 Centerville Rd., White Bear Township, MN (US) 55127; Anthony J. Angelo, 20755 Georgia Ave. N., Forest Lake, MN (US) 55025; Craig M. Wilson, 1023 17th Ave., SE., Minneapolis, MN (US) 55414

( * ) Notice: Subject to any disclaimer, the term of this patent is extended or adjusted under 35 U.S.C. 154(b) by 0 days.

(21) Appl. No.: 11/020,797

(22) Filed: Dec. 22, 2004

(65) Prior Publication Data
US 2005/0103702 A1    May 19, 2005

Related U.S. Application Data

(63) Continuation of application No. 10/194,536, filed on Jul. 12, 2002.

(60) Provisional application No. 60/305,565, filed on Jul. 13, 2001.

(51) Int. Cl.
*B01D 46/00* (2006.01)
*B01D 30/30* (2006.01)

(52) U.S. Cl. ............ 55/503; 55/495; 55/497; 55/498; 55/502; 55/510; 55/511; 96/6; 96/415; 96/416; 210/232; 210/238; 210/445; 210/450; 210/453

(58) Field of Classification Search ............... 96/6, 96/415, 416; 55/495, 497, 498, 502, 503, 55/510, 511; 210/238, 445, 446, 450, 453, 210/454, 483, 232, 282, 435
See application file for complete search history.

(56) References Cited

U.S. PATENT DOCUMENTS

| | | | | |
|---|---|---|---|---|
| 3,002,870 A | * | 10/1961 | Belgarde et al. ............ | 156/70 |
| 3,085,689 A | * | 4/1963 | Hering et al. ............ | 210/232 |
| 3,463,322 A | * | 8/1969 | Gerarde ................... | 210/455 |
| 3,615,257 A | * | 10/1971 | Frost et al. ............... | 422/101 |
| 3,782,083 A | * | 1/1974 | Rosenberg ................ | 55/491 |
| 3,803,810 A | * | 4/1974 | Rosenberg ................ | 96/6 |
| 3,932,153 A | * | 1/1976 | Byrns ...................... | 55/511 |
| 3,950,157 A | * | 4/1976 | Matney .................... | 55/503 |
| 4,111,807 A | * | 9/1978 | Boomus et al. .......... | 73/864.03 |
| 4,113,627 A | * | 9/1978 | Leason .................... | 210/446 |
| 4,118,323 A | * | 10/1978 | Sugiyama et al. ........ | 210/439 |
| 4,148,732 A | * | 4/1979 | Burrow et al. ............ | 210/232 |
| 4,159,954 A | * | 7/1979 | Gangemi .................. | 210/446 |

(Continued)

FOREIGN PATENT DOCUMENTS

DE    2 213 874    * 10/1973

(Continued)

OTHER PUBLICATIONS

European Search Report, Nov. 22, 2004.

*Primary Examiner*—Jason M. Greene
(74) *Attorney, Agent, or Firm*—Marshall & Melhorn LLC

(57) ABSTRACT

A fluid filter is provided with a snap-together housing for the filter media. The housing is designed with two main parts that are easily snapped together to encapsulate the filter media. The filter housing is substantially cylindrical, and contains an inlet on one end of the filter and an outlet on the opposing end. The filter can be designed so as to be opened for the replacement of the filter media.

7 Claims, 7 Drawing Sheets

U.S. PATENT DOCUMENTS

| | | | |
|---|---|---|---|
| 4,204,960 A * | 5/1980 | Sugiyama et al. | 210/232 |
| 4,229,306 A * | 10/1980 | Hein et al. | 210/446 |
| 4,256,474 A * | 3/1981 | Berger et al. | 96/152 |
| 4,326,957 A * | 4/1982 | Rosenberg | 210/436 |
| 4,341,538 A * | 7/1982 | Vadnay et al. | 96/6 |
| 4,362,047 A * | 12/1982 | vonReis et al. | 73/23.33 |
| 4,404,006 A * | 9/1983 | Williams et al. | 55/502 |
| 4,525,182 A * | 6/1985 | Rising et al. | 96/6 |
| 4,838,901 A * | 6/1989 | Schmidt et al. | 95/90 |
| 4,906,260 A * | 3/1990 | Emheiser et al. | 95/279 |
| 5,035,797 A * | 7/1991 | Janik | 210/232 |
| 5,037,460 A * | 8/1991 | Machado | 55/480 |
| 5,147,545 A * | 9/1992 | Despard et al. | 210/445 |
| 5,222,488 A * | 6/1993 | Forsgren | 128/201.25 |
| 5,230,727 A * | 7/1993 | Pound et al. | 55/492 |
| 5,269,917 A * | 12/1993 | Stankowski | 210/232 |
| 5,308,483 A * | 5/1994 | Sklar et al. | 210/232 |
| 5,344,561 A * | 9/1994 | Pall et al. | 210/508 |
| 5,443,723 A * | 8/1995 | Stankowski et al. | 210/321.75 |
| 5,451,321 A * | 9/1995 | Matkovich | 210/641 |
| 5,556,541 A * | 9/1996 | Ruschke | 210/232 |
| 5,618,425 A * | 4/1997 | Mitamura et al. | 210/493.5 |
| 5,725,621 A * | 3/1998 | Pruette et al. | 55/377 |
| 5,753,117 A * | 5/1998 | Jiang | 210/232 |
| 5,827,429 A * | 10/1998 | Ruschke et al. | 210/321.75 |
| 5,935,282 A * | 8/1999 | Lin | 55/385.6 |
| 6,033,455 A * | 3/2000 | Kurashima | 55/497 |
| 6,168,653 B1 * | 1/2001 | Myers | 96/4 |
| 6,168,718 B1 * | 1/2001 | Sutter et al. | 210/651 |
| 6,171,493 B1 * | 1/2001 | Zia et al. | 210/257.1 |
| 6,245,230 B1 * | 6/2001 | Ricci | 210/232 |
| 6,398,838 B1 * | 6/2002 | Kaffenberger | 55/498 |
| 6,427,847 B1 * | 8/2002 | Zia et al. | 210/472 |
| 6,440,303 B2 * | 8/2002 | Spriegel | 210/232 |
| 6,517,598 B2 * | 2/2003 | Anderson et al. | 55/498 |
| 6,533,931 B1 * | 3/2003 | Reid | 210/232 |
| 6,716,348 B1 * | 4/2004 | Morgan | 210/232 |
| 6,802,425 B2 * | 10/2004 | Zia et al. | 210/472 |
| 2001/0000204 A1 * | 4/2001 | Castino et al. | 210/640 |
| 2002/0069625 A1 * | 6/2002 | Stass | 55/385.3 |
| 2002/0108896 A1 * | 8/2002 | Malkin | 210/232 |

FOREIGN PATENT DOCUMENTS

| | | |
|---|---|---|
| DE | G 92 18 639.4 U1 * | 2/1995 |
| WO | WO 98/40147 A1 * | 9/1998 |

* cited by examiner

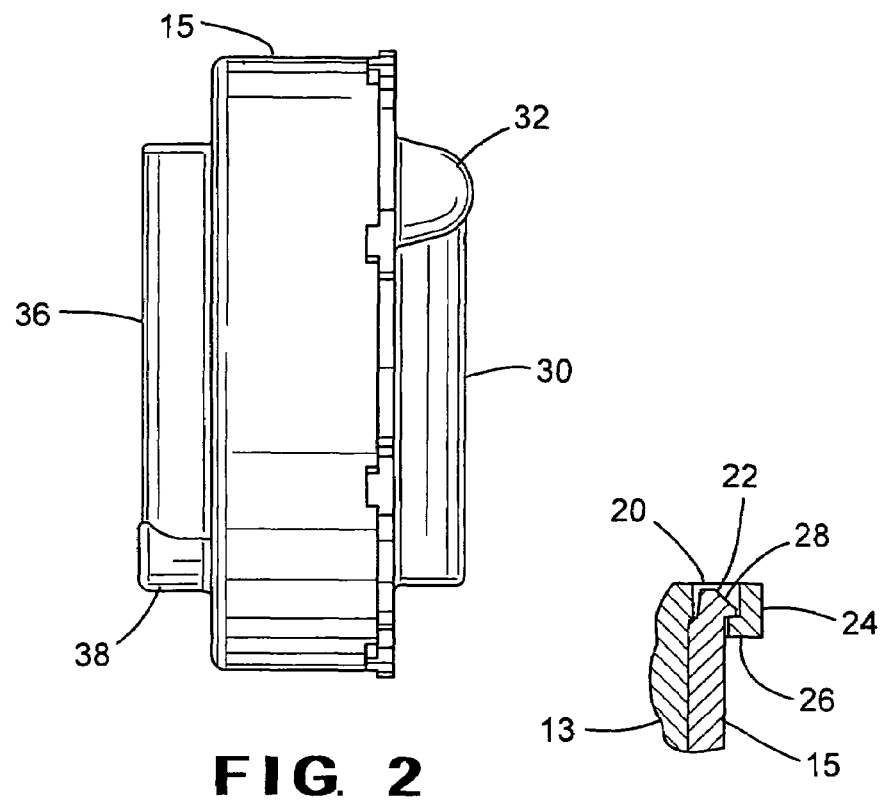
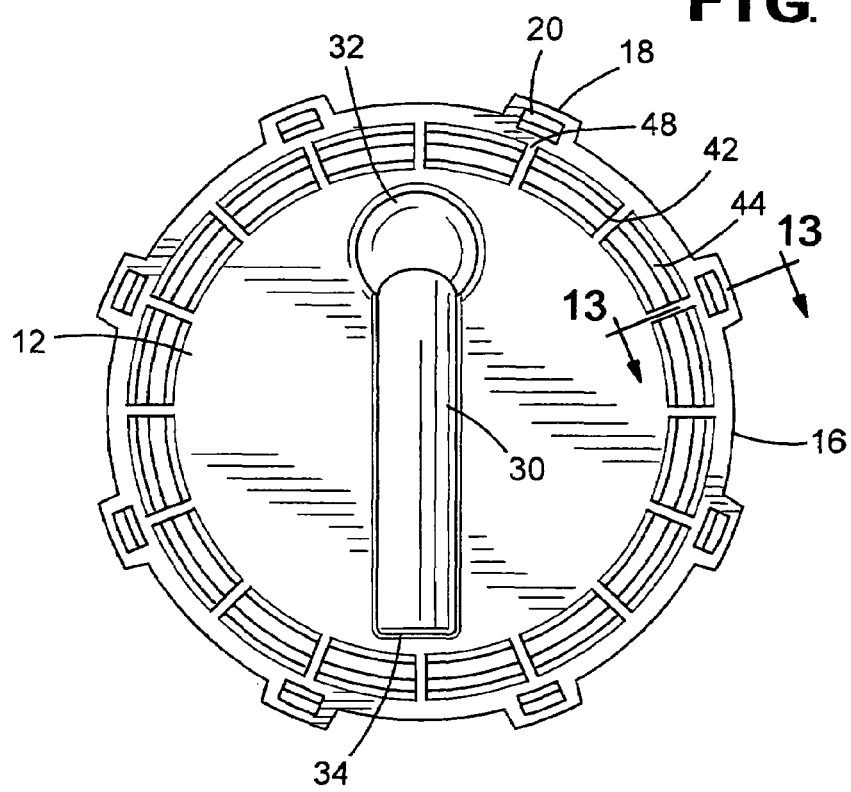

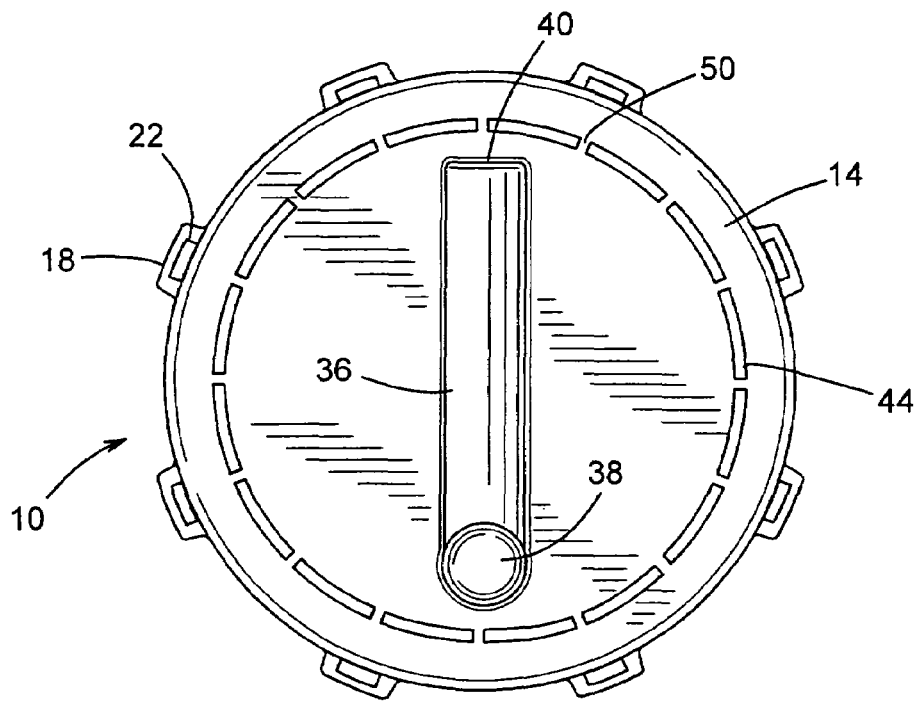
FIG. 4
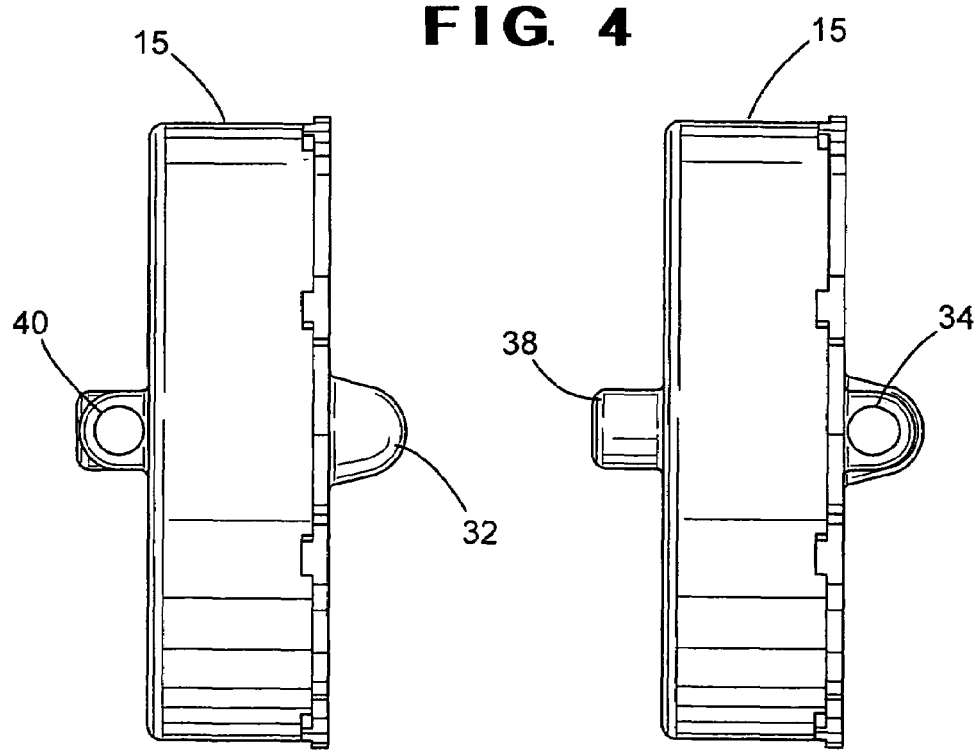
FIG. 5  FIG. 6

SNAP TOGETHER FILTER

CROSS-REFERENCE TO RELATED APPLICATIONS

This application is a continuation of application Ser. No. 10/194,536, filed Jul. 12, 2002, for Snap Together Filter. Application Ser. No. 10/194,536 claims priority from provisional application 60/305,565, filed Jul. 13, 2001, and is pending as of the filing date of the present application. U.S. patent application Ser. Nos. 10/194,536 and 60/305,565 are hereby incorporated by reference as if set forth in their entirety herein.

BACKGROUND OF THE INVENTION

Field of the Invention

The present invention relates to a filter device with a snap together housing. More particularly, the present invention is drawn to a housing for a biological fluid filter, preferably for the filtration of blood leukocytes.

Known filters for blood filtration systems utilize a variety of filter media depending on the application desired. Because of the biological nature of the material being filtered, it is required that the filter housing be hermetically sealed to prevent leakage from the filter, or contamination of material within the filter housing. Typically the filter housing is sealed by methods such as sonic welding, heat treatment or by adhesive compounds.

These known methods of sealing the filter housings all have significant disadvantages. In the case of heat treatment or sonic welding, some filter media may be susceptible to damage by the application of such high-energy methods of sealing to the filter housings. For example, glass based filtration media are not suitable for use when the housing is to be sonically welded, as the media may be damaged in the process. Adhesives can have the drawback of potential contamination of the filter media by components from the adhesive, which may be leeched into the interior of the housing. Additionally, with these methods it is difficult to insure that the entire periphery of the filter housing is hermetically sealed, e.g. gaps in the adhesive or failures of sections of the sonic weld. Additionally, these forms of sealing prevent the housing from being easily disassembled in the future, as they are in essence "permanent" bonds.

The housing of the present invention is designed as a multi-piece unit, with two main sections. The main sections of the housing can be easily snapped together, around a filter media, to form the outer housing for the filter media. Various methods (such as an o-ring, or other sealing structure) can be applied to seal the filter housing.

SUMMARY OF THE INVENTION

The problems of the prior art are solved by the present invention utilizing a multi-part housing, preferably a two-part housing, with snap connectors to connect the parts together.

The housing can be made of any material that is commonly used for filter housings in the art. The connectors, to connect the housing sections together, can either be primarily outside the outer periphery of the housing, or primarily inside the outer periphery of the housing.

The housing is preferably cylindrical, with an inlet and an outlet disposed on the opposing major faces of the circular housing. In other applications, other geometries, for example square or hexagonal, can be used. In use, the cylindrical housing will typically be oriented with the longitudinal axis of the cylinder substantially parallel to the ground.

"Each of the inlet and the outlet will preferably also have a tubular flow channel on the face of the cylinder on which it is disposed. Each tubular flow channel will have an opening to the outside of the housing, and an opening into the housing."

Inside the housing, on each of the opposing major internal faces of the housing, are preferably raised ridges, which raised ridges are positioned to abut the filter media inside the housing. These ridges can support the filter media to hold it in its proper position, and/or the ridges can control the flow of fluid on either side of the media to insure that fluid flows through the entirety of the filter media and is not overly concentrated in one particular area of the filter.

In general, any filter media, as is customarily used in the art, is suitable for use with the present invention.

A primary reason for the development of the present invention has been to develop a biological fluid filter in which captured biological substances within the housing may be easily recovered and/or may be easily processed further to produce therapeutically valuable products. For example, in the case of leukocyte reduction from blood or blood products, it would be advantageous to recover the captured leukocytes for production of therapeutic products such as interferon. The filter media may also capture other cells or proteins that may be of therapeutic interest.

For example, in leukocyte reduction of whole blood, leukocytes and platelets are typically removed by the filter media and they are then disposed of. The present invention enables recovery of the main filter component (mainly the filter media) that contains therapeutic products of interest. The filter media may be processed separately to purify or separate out the therapeutic product of interest.

Thus, it is an object of the present invention to provide an improved housing for a fluid filter.

It is a further object of the invention to provide a housing for a filter device, which can be disassembled to recover material retained within the housing.

It is a further object of the invention to provide a housing for a filter device, which can be disassembled for the replacement of the filter media.

A further object of the invention is to provide a snap-together filter housing which can be easily assembled, but which is tamper resistant so that it cannot be easily disassembled without special tools or knowledge.

Yet another object of the invention is to provide a means of recovery of captured therapeutic components from a biological fluid.

Another object of the present invention is to provide a housing for a filter for filtering biological fluids.

Another object of the present invention is to provide a housing for a filter to separate out blood or blood products into their more valuable therapeutic products.

"In one embodiment of the present invention the filter housing includes a filter media treated in a manner such that the media secured within the pinch seal provides a barrier to fluid flow across the pinch seal. Although an o-ring is not necessary for such a design, o-ring(s) may be used. The snap together filter may not be limited to a single use but at the same time is tamper resistant for certain critical applications such as in the medical industry. The present invention provides a filter housing which is well suited for filtration of fluids such as blood or blood products in the medical industry. More specifically the current invention is well suited in a biological fluid filtration set such as those used for leukocyte reduction of blood and blood products. The captured cellular components may be easily removed from the filter housing after the set has been used. The present invention is well suited for encapsulating one or multiple layers of filter media for filtering biological fluids, especially blood or blood products. More specifically the present invention is well suited for leukocyte reduction of blood or blood products."

Further objects and advantages of the present invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 2 is a front elevational view of the embodiment shown in FIG. 1.

FIG. 3 is a right side elevational view of the embodiment of the present invention shown in FIG. 1.

FIG. 4 is a left side elevational view of the embodiment of the present invention shown in FIG. 1.

FIG. 5 is a top view of the embodiment of the present invention shown in FIG. 1.

FIG. 6 is a bottom view of the embodiment of the present invention shown in FIG. 1.

FIG. 13 is a sectional view through the line F-F of FIG. 1.

DESCRIPTION OF THE PREFERRED EMBODIMENT

Figure 1:
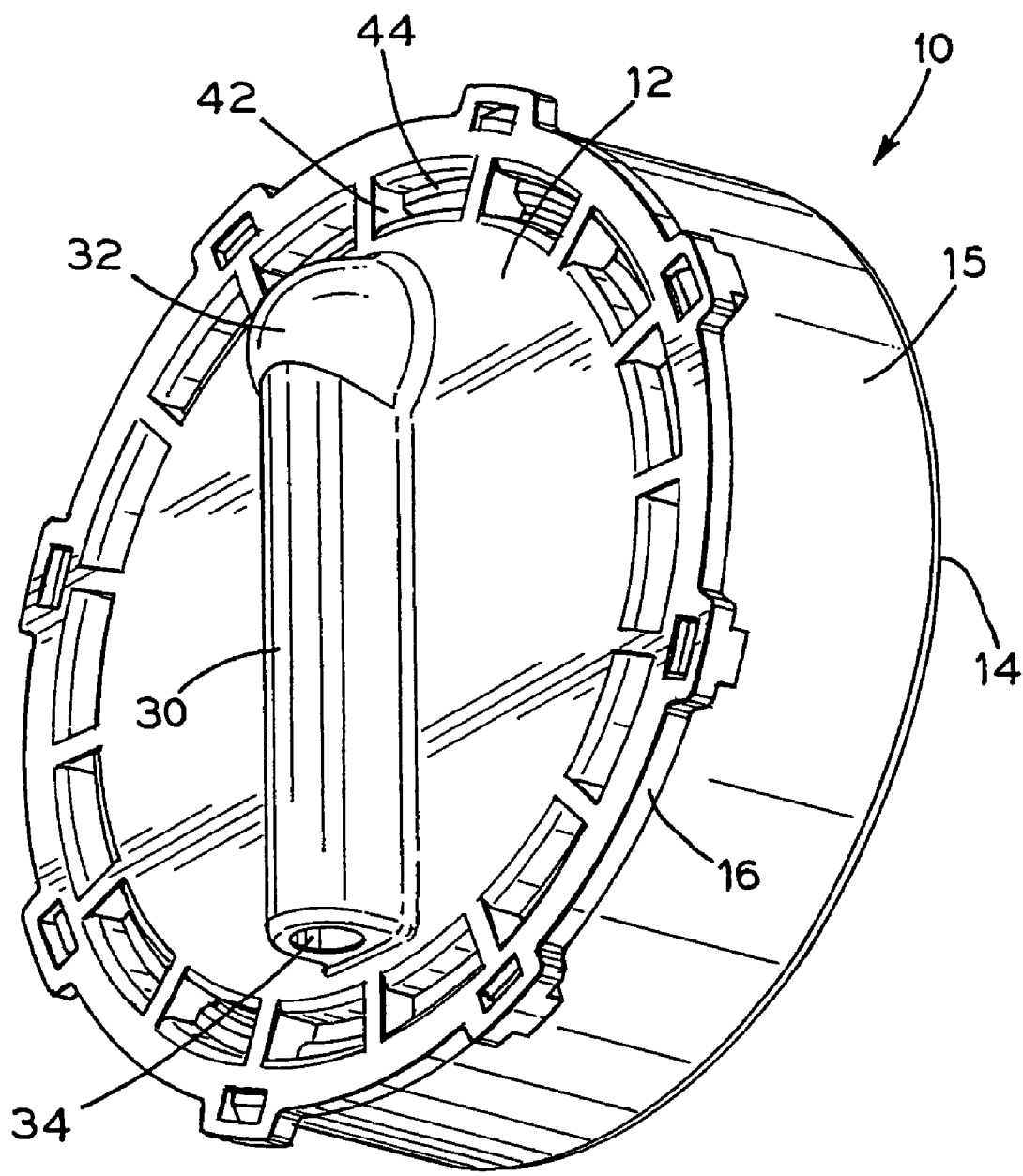
FIG. 1 is a perspective view of an embodiment of the present invention.
Figure 7:
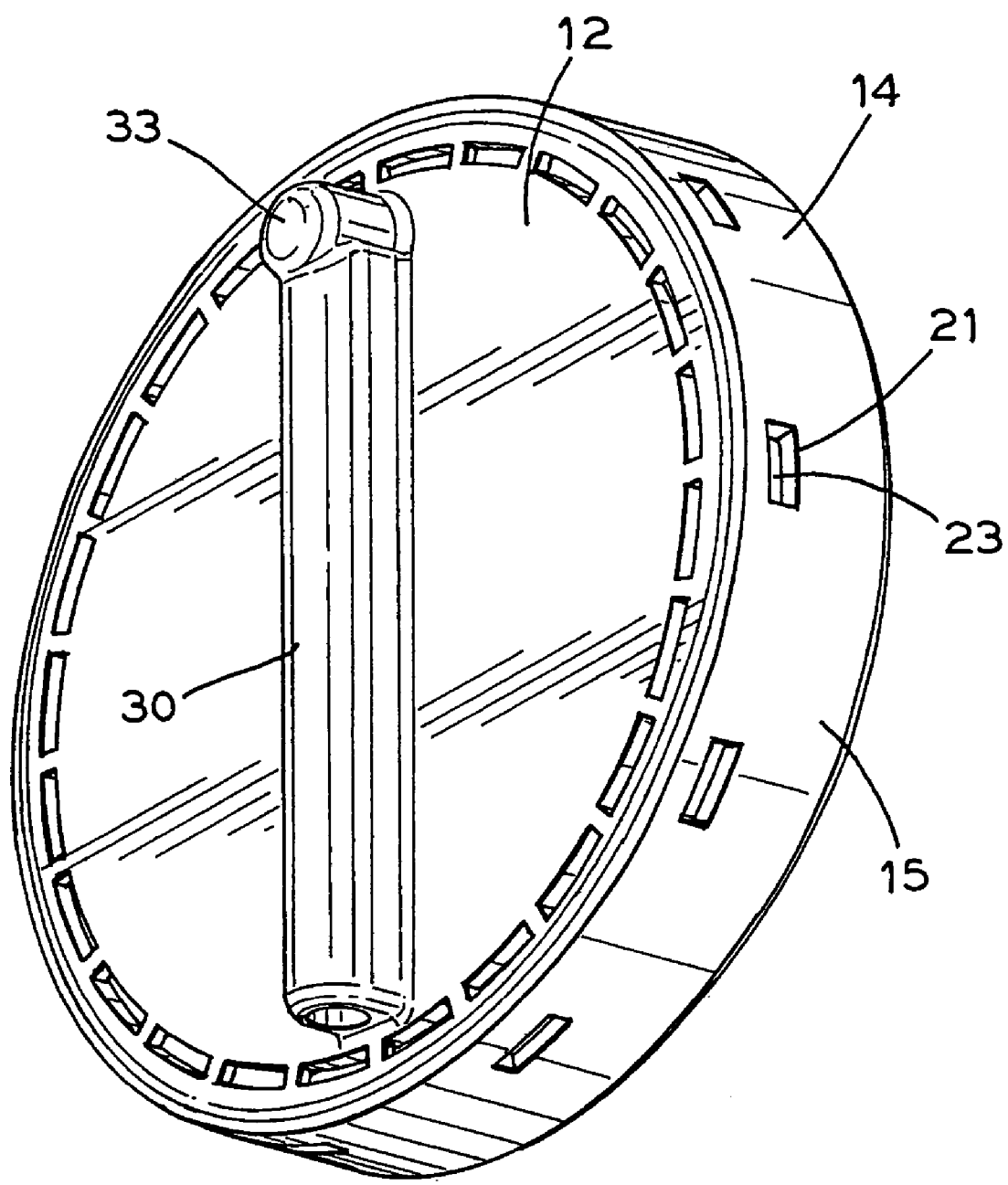
FIG. 7 is a perspective view of an embodiment of the present invention.
Figure 8:
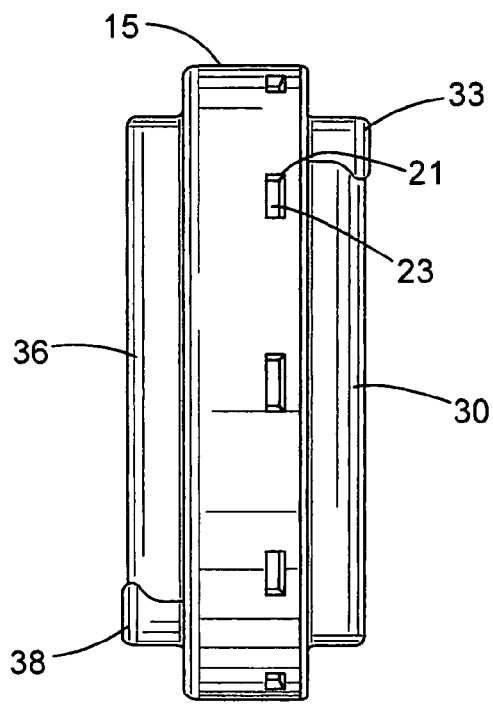
FIG. 8 is a front elevational view of the embodiment shown in FIG. 7.

U.S. Pat. No. 5,451,321 to Matkovich shows a biological fluid processing assembly for filter biological processes such as blood. This patent is incorporated by reference as if set forth in its entirety herein, to demonstrate a system in which the present filter can be utilized.

Another such system, in which the present inventive filter may be utilized, is shown in U.S. Pat. No. 6,171,493, issued Jan. 9, 2001, to Zia et al., which is also incorporated by reference as if set forth in its entirety herein. U.S. patent application Ser. No. 09/688,999, also showing a biological fluid filter, is incorporated by reference as if set forth in its entirety herein. Additionally, U.S. provisional patent application Ser. No. 60/334,256 is hereby incorporated by reference as if set forth in its entirety herein.

"FIGS. 1 through 6 represent a first embodiment of the present invention. In these figures, a filter 10 includes a first housing portion 12 and a second housing portion 14. The housing portions 12, 14 are constructed separately so that a filter media (not shown) can be placed between them. The first housing portion 12, in this embodiment, has a ring 16 projecting radially outward from the peripheral wall 13 (see FIG. 13) of the housing. A plurality of projecting portions 18 are disposed about the outer periphery of the ring 16. Each of the projecting portions 18 includes a notch 20. In other embodiments of the present invention, the notches can be cut directly in the ring 16 without the additional projections 18. The notches 20 can be made substantially circular to a certain depth in the projecting portion, and can then be pressed in a substantially oval shape to make a notch through the entire thickness of the projection 18.

The other housing portion 14 includes a plurality of tabs 22 which correspond to the notches 20. The tabs 22 project radially outwardly from the peripheral wall 15 (see FIG. 13) of housing section 14 at intervals that will align the tabs 22 with the notches 20 for assembly of the filter 10. In a preferred embodiment, there are an equal number of tabs 22 and notches 20. When assembled, the outer wall 15 of housing portion 14 will be disposed about the outer wall 13 of housing portion 12. In preferred embodiments of the present invention, wall 13 can be of substantially the same length as wall 15, to arrange for a tight fit of the housing sections 12, 14 but can also be shorter than wall 15 in alternative embodiments."

The housing portion 12 additionally has an inlet tube 30 affixed to the outside of the housing. The tube 30 is preferably integrally constructed with the housing 12 but can be separately manufactured and attached. The tube includes an end 32, through which an opening (see FIG. 15) allows fluid to enter the housing section 12. The tube 30 also includes an inlet opening 34 for entry of fluid into the tube.

The housing portion 14 additionally has an outlet tube 36 corresponding to the inlet tube 30 on the opposing face. The outlet tube 36 again has an end 38 through which an opening (see FIG. 16) allows flow of fluid from the housing section 14 into the tube 36. An outlet 40 from the tube 36 thus allows the flow of filtered fluid from the filter 10. It is preferred that tubes 30 and 36 are disposed substantially parallel to each other, on the opposing faces of the filter, with their respective openings into the housings at opposite ends of the tubes, as depicted herein. In other embodiments of the present invention it may not be necessary for the tubes to be substantially parallel to each other and may instead be skew to one another.

In a preferred embodiment, the ends 32, 38 can be approximately the same size. In the embodiment shown in FIGS. 1-6, the end 32 is significantly larger than the end 38. Additionally, the end 38 is substantially cylindrical in nature, with the cylinder axis substantially perpendicular to the face of the housing section 14. The end 32, to the contrary, is substantially rounded, thus forming a substantially hemispherical end. In at least one embodiment, the end 32 is larger than the end 38 because the end 32 is being used as the inlet for the material to be filtered. This end can be larger to prevent the blocking of the inlet due to particulate material in the fluid to be filtered. As the outlet side will have been filtered, this is not as much concern for the outlet. In other embodiments, the inlet and outlet can be the same size, or the outlet opening can even be larger than the inlet.

In addition, the exterior major faces of the housing sections 12, 14 can have a series of notches 42, 44 cut in the exterior face. The notches 44 are preferably in the form of a circular channel about the face of the second housing section 14, and are divided from one another by solid sections 50. The notches 42 are preferably separated from one another by solid sections 48. Additionally, the notches 42 preferably are not cut to a constant depth. Instead, the notches 42 preferably contain a stepped or raised portion 44 inside the notch 42. These notches are preferably aligned with raised portions in the interior of the housing sections (see FIGS. 15 and 16.)

In a preferred embodiment, the peripheral walls 13, 15 are angled slightly from perpendicular to the faces of the housing sections 12, 14. This can be done to allow the housing sections to easily fit over one another. The angle of these walls can be, for example, about three degrees from perpendicular. Other angles may also be possible, within the scope of the present invention, without adversely affecting the inventive housing. Additionally, the walls 13, 15 can be at substantially 90-degree angles to the faces of the housing sections 12, 14.

The design interconnection of the tabs 22 with the notch 20 can be seen in the sectional view shown in FIG. 13. It can be seen here that the projection 18 from the wall 13 of the housing portion 12 also includes an additional projection 24, projecting substantially transverse to the projection 18. This projection 24 is substantially parallel to the peripheral wall 13 of the housing portion 12. A connecting portion 26 then projects from projection 24, substantially perpendicular to projection 24, back towards the peripheral wall 13 of housing portion 12.

"Tab 22 can also be seen, on this figure, to include a connecting portion 28 projecting radially outward from the peripheral wall of housing portion 14. Thus, when assembled, the connecting portion 28 of tab 22 overlaps the connecting portion 26 from projection 24. This interconnection between the connecting parts 26, 28 can secure the two portions of the housing into a secure whole."

While the above discussed connection is illustrative of a manner to connect the two housing portions, it is not the only way the two housing portions can be snapped together. Other interlocking mechanisms can be suitable for use with embodiments of the present invention.

Figure 14:
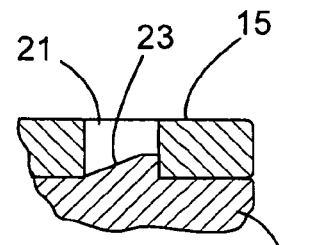
FIG. 14 is a sectional view through the line A-A of FIG. 7.

FIGS. 7-12 and 14 depict an alternative embodiment of the present invention. In this alternative embodiment, substantially similar components are identified by the same reference numeral. Components with a substantially different design or functionality are identified by a different reference numeral. A significant difference in these embodiments can be seen in FIG. 14, which illustrates an alternative snap-together mechanism, which is utilized in this embodiment. In this snap-together mechanism, wall 15 of housing section 14 has notches 21 cut directly into the wall (which will be the exterior wall when assembled), and not on separate protruding sections. Wall 13 of housing section 12 has tabs 23 directly protruding substantially radially outward from the wall 13. As can be seen in FIG. 14, the tab 23 is designed so that it has a slanted face, which will engage with the wall when it is being assembled, and then a face which is preferably substantially projecting radially transverse to the wall 15. Therefore, once the transverse face of the tab 23 slides into the notch 21, the tab 23 will "snap" into the notch 21 to form the "snap fit" as discussed above. If disassembly of the housing is required, for example to change the filter media, pressure against the tab 23 can remove it from the notch 21 and the housing can then be disassembled.

Figure 9:
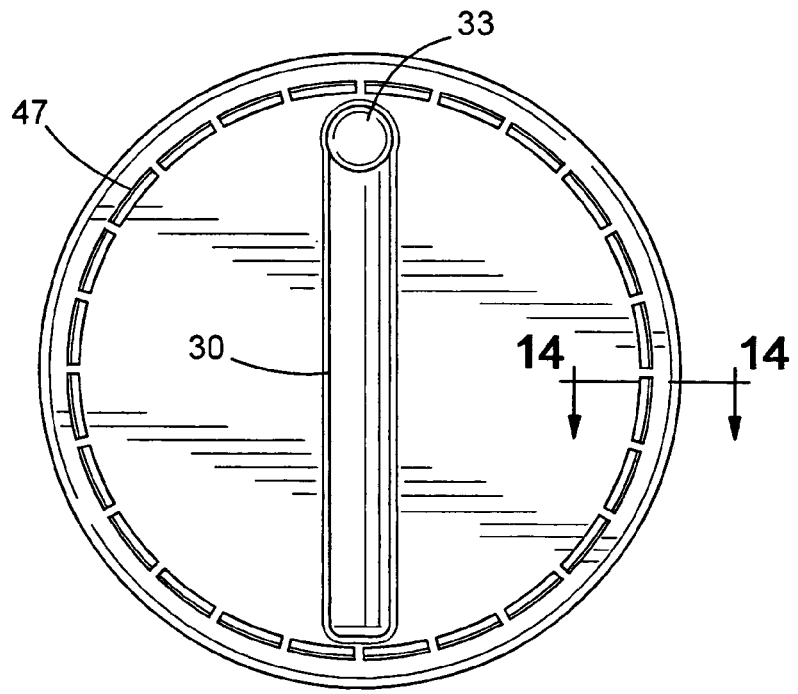
FIG. 9 is a right side elevational view of the embodiment of the present invention shown in FIG. 7.
Figure 10:
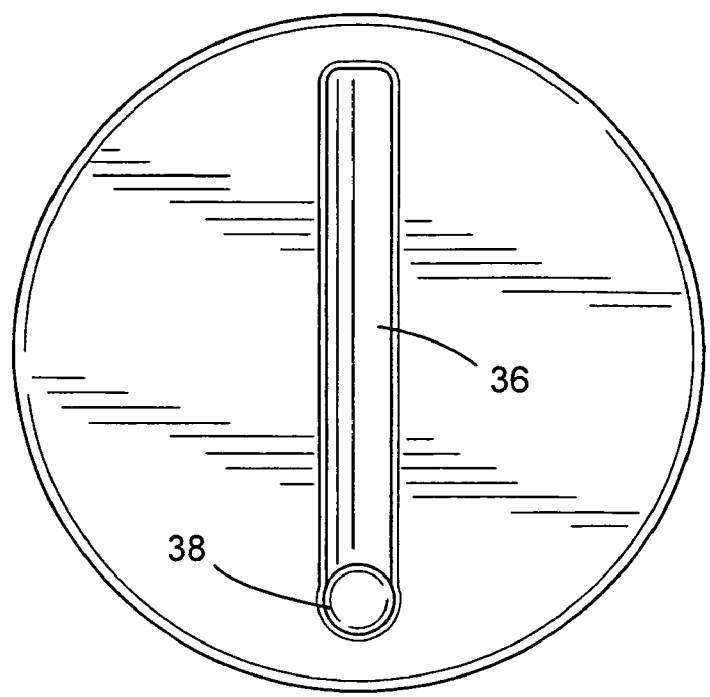
FIG. 10 is a left side elevational view of the embodiment of the present invention shown in FIG. 7.
Figure 11:
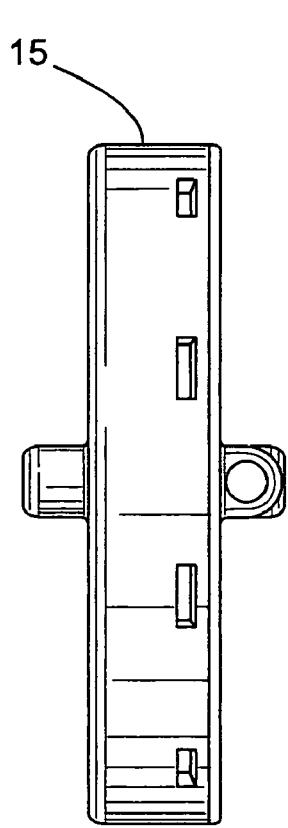
FIG. 11 is a top view of the embodiment of the present invention shown in FIG. 7.
Figure 12:
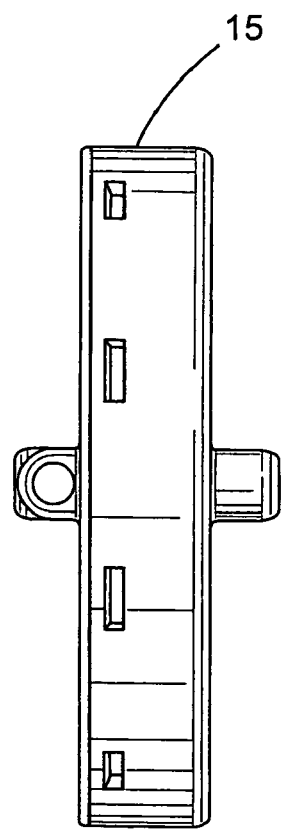
FIG. 12 is a bottom view of the embodiment of the present invention shown in FIG. 7.

Other differences of the embodiment depicted herein, is that an end 33 of the inlet channel 30 is substantially identical in size and design to that of the end 38 of the outlet channel 36. Additionally, in FIG. 10, there is no recessed ring on the face as there was in FIG. 4. The recessed ring 47 in FIG. 9 is of a uniform depth (except for the bridging material, which is of uniform depth with the face of the housing section 12).

In at least one embodiment of the present invention, the recessed ring in the outer face is designed, to as great an extent as possible, to make a uniform thickness in the outer housing. Thus, where there is a build up of material within the housing, the outer housing can be recessed to maintain as much uniformity as possible. This may improve the structural characteristics of the housing. Additionally, the design of the recessed areas can be decorative.

The above differences between the embodiments are not linked together in a given embodiment. Therefore the features of the differing embodiments can be exchanged between the embodiments depending on the final features desired in the product.

Any material commonly suitable as filter media, for the given application, can be used in the present invention. The housing can be made of any material suitable for use with the chosen fluid to be filtered. For example, for a blood leukocyte filter, any bio-compatible housing material can be used, for example polycarbonate, acrylic or their blends. While these materials are acceptable, they are not the only materials for such usage. A wide variety of materials for filter housings are known in the art and are suitable for use with the present invention. In addition, the housing or parts of the housing may be substantially transparent or substantially opaque. A transparent housing would allow visual inspection of the filter media within the housing without disassembly of the housing. An opaque housing would prevent the viewing of the filter media in applications where such viewing would be undesirable (for example, in a medical device where the filter was visible to the patient.) The material of the housing is not considered to be crucial to the design of the present invention.

While the present embodiments have depicted the first section of the housing 12 as being the inlet side, it is within the scope of the present invention that either the first section 12 or the second section 14 could serve as the inlet side.

Figure 15:
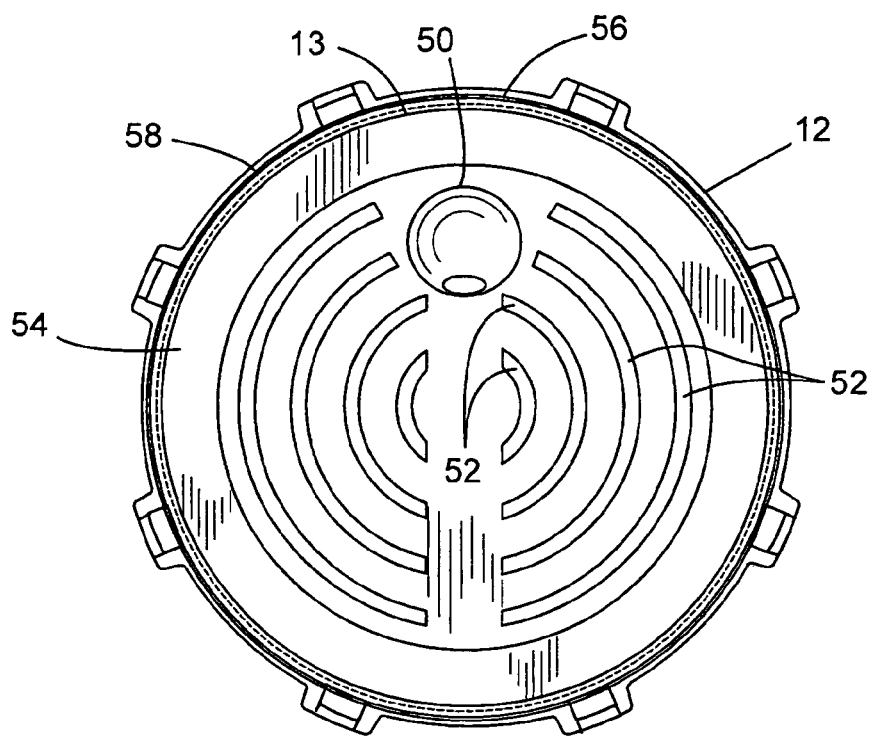
FIG. 15 is a side view of one of the housing sections of the embodiment shown in FIG. 1.

FIG. 15 shows the interior of the housing section 12 illustrated in FIG. 1. In this embodiment, opening 50 allows the flow of fluid from the inlet tube. Inside the housing section 12 are a series of concentric ribs or pinch shields 52. In the embodiment shown, these ribs are designed as concentric arcs, extending along a significant portion of a hemisphere of the housing section 12. These ribs both support the filter media (not shown) and also regulate the flow of material through the housing section. The ribs can be designed to maximize the utilization of the filter media to prevent over utilization of some areas of the filter media and under utilization of other areas of the filter media. An outer circular ring 54 defines the limits of the flow area of the fluid and further supports the filter media.

An additional optional feature of the invention is an O-ring 58. This O-ring can be positioned outside of the wall 13 in an optional groove (shown as dashed line 56). This O-ring can help to prevent leakage of fluid from the filter 10. In this embodiment, the O-ring will essentially be between the walls 13 and 15 when assembled. The O-ring is preferably positioned as near the projections 18 as possible without interfering with the snap-fitting action. In other embodiments, the O-ring can be disclosed anywhere between the walls.

Figure 16:
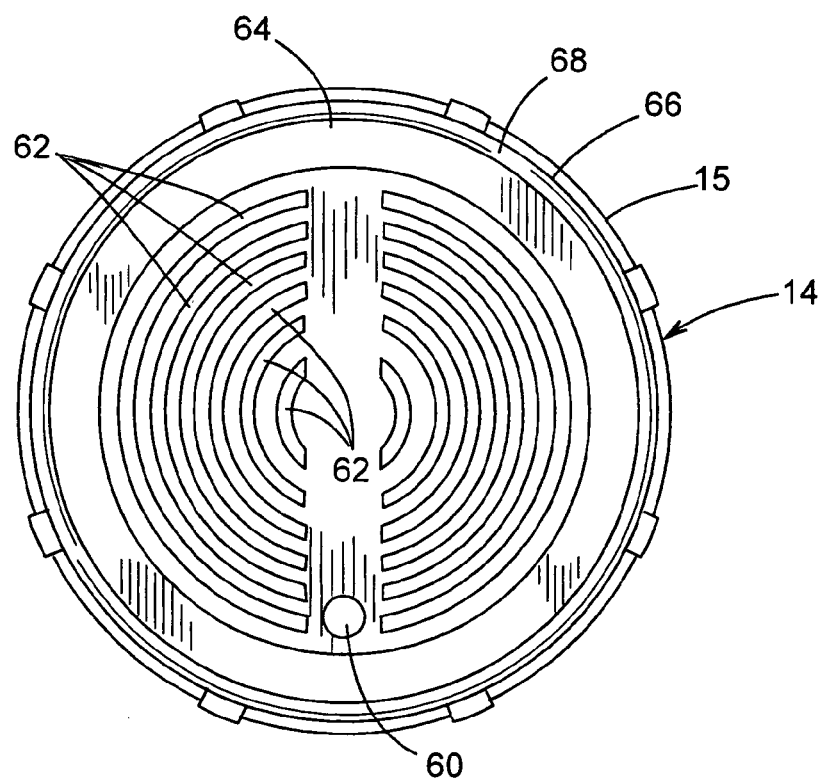
FIG. 16 is a side view of the other housing section of the embodiment shown in FIG. 1.

FIG. 16 illustrates a possible embodiment of the interior of housing section 14, as depicted in the embodiment shown in FIG. 1. A flow opening 60 leads to the outlet tube allowing flow to exit the filter. Again, a series of concentric ribs 62, are disposed to support the filter media and to control fluid flow on the outlet side of the filter media. As in the case with housing section 12, a circular support 64 limits the flow of fluid on the outlet side of the filter media, and defines a recess 66 between the circular support 64 and the wall 15. An optional O-ring 68 can be placed in the recess between the circular support 64 and the wall 15. When the filter 10 is assembled the O-ring will then be between the top of wall 13 and the housing 14, thus providing a seal against leakage.

While the above described embodiments depict the optional use of one or two O-rings to prevent leakage in the filter, other placements of O-rings are acceptable. Such O-rings are commonly known and used in the art and any such location, for example, outside both of the filter sections adjacent the snap-together fittings, would be acceptable. The above discussed O-ring locations, while preferred, are not to be considered limiting. Additionally, the use of the O-rings at all is not required in the present invention.

As shown in FIGS. 15 and 16, the section 12 has fewer rings 52 than rings 62 in section 14. This is because it is believed that fewer rings, with wider flow passages, are preferable on the inlet side of the filter. The outlet side of the filter will essentially provide support against the differential pressure exerted on the filter media by the fluid. Therefore the additional rings 62 on the outlet side of the filter can result in improved support for the filter media and decreased hold-up and retention volumes of the filter. The rings on the inlet and outlet side provide support for the filter media which secures the filter media within a desired gap which reduces the possible of fluid channeling within or around the filter-media, improving the filter performance. Thus the rings operate as a "pinch shield" against "bypass" of the fluid. Other numbers and size of supports 52, 62 are possible within the scope of the present invention depending on the flow characteristics desired, and the fluid to be filtered.

While the above discussed embodiments reflect a cylindrical housing of the filter, other geometries may be appropriate. For example, a housing with a square or hexagonal cross-section may be appropriate for various applications. Other cross-sectional shapes for the filter housing, including both regular and irregular geometries, could be used in embodiments of the present invention.

The above discussed embodiments illustrate alternative snap-together fittings for the present invention. The snap together fittings allow the sections of the housing to be securely fastened, but then to also be disengageable for later separation of the sections. This may be necessary for reasons such as removal and replacement of the filter media. Additionally, the housing sections can be secured to each other by more permanent means, for example by sonic welding or adhesive. Such would be recommended in applications wherein separation of the filter parts was not desired subsequent to assembly.

Therefore, by carefully studying the problems present in prior art biological filtration fluid systems; we have developed a novel method and apparatus for a snap together filter.

In accordance with the provisions of the patent statutes, the present invention has been described in what is considered to represent its preferred embodiment. However, it should be noted that the invention could be practiced otherwise than as specifically illustrated and described without departing from its spirit or scope.

The invention claimed is:

1. A tamper resistant, snap-together, filter housing which can be easily assembled, but which can not be easily disassembled without special tools or knowledge to apply inwardly directed pressure to at least one portion of the filter housing.

2. A two-part snap-together filter housing to hold a filter in a pinch seal for leukocyte reduction which can be easily assembled, but which cannot be easily disassembled without the special tools or knowledge to apply inwardly directed pressure to at least one part of the two-part filter housing.

3. A snap-together, multi-part, filter housing to hold a filter in a pinch seal comprising a continuous outer wall and having connectors to connect the housing parts together which can easily be assembled, but which cannot be easily disassembled without special tools, wherein the connectors are primarily inside the outer periphery of the multi-part filter housing, and at least a portion of the connectors comprise openings in the continuous outer wall of the multi-part filter housing.

4. A tamper resistant filter comprising:
   (a) a hydrophilic flat filter media, and
   (b) a housing for said tamper resistant filter comprising two main sections which can be easily snapped together around said filter media to hold said filter media in a pinch seal between said two main sections, but which can not be disassembled without special tools.

5. A snap-together, multi-part, filter housing which holds a filter in a pinch seal within the filter housing, comprising a continuous outer wall and having connectors to connect the housing parts together which can easily be assembled, but which cannot be easily disassembled without special tools, wherein the connectors are primarily outside the outer periphery of the multi-part filter housing, and at least a portion of the connectors comprise openings in the continuous outer wall of the multi-part filter housing.

6. A two-part snap-together filter housing comprising a first housing section having a first outer peripheral wall, and a ring projecting outwardly from the first outer peripheral wall, the ring having a plurality of projecting portions, each of said projecting portions having a notch extending therethrough, and a second housing section having a second outer peripheral wall, with a plurality of tabs corresponding to the notches, wherein the second housing section will be an exterior wall when the two-part filter housing is assembled, the peripheral wall of the second housing section will cover the peripheral wall of the first housing section, and the tabs will engage the notches without extending therethrough, thereby fastening the two halves of the filter housing together.

7. A two-part snap-together filter housing comprising a first housing section having a first peripheral wall, and a plurality of tabs protruding substantially radially outward from the first peripheral wall, and a second housing section having a second peripheral wall of substantially the same length as the first peripheral wall, wherein the second housing portion will form the exterior wall when the two-part filter housing is assembled, and has a plurality of notches extending through the second peripheral wall corresponding to the tabs on the first peripheral wall, and wherein the tabs will engage the notches without extending therethrough, thereby fastening the first housing section and the second housing section of the two-part filter housing together, with the first peripheral wall covered by the second peripheral wall, thereby holding a filter in a pinch seal between the first housing section and the second housing section.

* * * * *

UNITED STATES PATENT AND TRADEMARK OFFICE
CERTIFICATE OF CORRECTION

| | |
|---|---|
| PATENT NO. | : 7,303,605 B2 |
| APPLICATION NO. | : 11/020797 |
| DATED | : December 4, 2007 |
| INVENTOR(S) | : Majid Zia et al. |

It is certified that error appears in the above-identified patent and that said Letters Patent is hereby corrected as shown below:

On the Title page of the patent, to correctly show the assignee, please insert the following after the listing of the inventors:

--(73)   Assignee:   Hemerus Medical, LLC,   St. Paul, MN   (US)--

Signed and Sealed this
Twentieth Day of March, 2012

David J. Kappos
*Director of the United States Patent and Trademark Office*